US009529579B2

(12) United States Patent
Brunet et al.

(10) Patent No.: US 9,529,579 B2
(45) Date of Patent: Dec. 27, 2016

(54) SYSTEM AND METHOD OF DYNAMIC CONFIGURATION ENGINE FOR ELECTRONIC DEVICES

(71) Applicant: CrowdCare Corporation, Richmond Hill (CA)

(72) Inventors: Jeffrey Brunet, Aurora (CA); Yousuf Chowdhary, Maple (CA); Ian Collins, Markham (CA); Lijin (Michael) Wen, Richmond Hill (CA)

(73) Assignee: Crowdcare Corporation, Richmond Hill, Ontario (CA)

( * ) Notice: Subject to any disclaimer, the term of this patent is extended or adjusted under 35 U.S.C. 154(b) by 0 days.

(21) Appl. No.: 14/534,410

(22) Filed: Nov. 6, 2014

(65) Prior Publication Data
US 2015/0128126 A1    May 7, 2015

Related U.S. Application Data

(60) Provisional application No. 61/962,360, filed on Nov. 6, 2013.

(51) Int. Cl.
*G06F 9/44* (2006.01)
*G06F 9/445* (2006.01)

(52) U.S. Cl.
CPC ........................... *G06F 8/65* (2013.01)

(58) Field of Classification Search
CPC .......... G06F 8/65; G06F 8/71; G06F 9/44505
USPC ................................................. 717/121, 172
See application file for complete search history.

(56) References Cited

U.S. PATENT DOCUMENTS

| 7,711,783 | B1* | 5/2010 | Violleau et al. ............. 709/206 |
| 7,974,613 | B1* | 7/2011 | Shanker .................... G06F 8/68 455/418 |
| 7,975,264 | B2* | 7/2011 | Sriram, I .................. G06F 8/68 717/169 |
| 8,595,186 | B1* | 11/2013 | Mandyam et al. .......... 707/632 |
| 8,887,151 | B2* | 11/2014 | Dugan ...................... G06F 8/65 717/172 |
| 2006/0107314 | A1* | 5/2006 | Cataldi ......................... 726/15 |
| 2008/0205419 | A1* | 8/2008 | Shin et al. ................... 370/401 |
| 2009/0055553 | A1* | 2/2009 | Chasman et al. ............ 709/248 |
| 2012/0079100 | A1* | 3/2012 | McIntyre et al. ............ 709/224 |

* cited by examiner

*Primary Examiner* — Anna Deng
(74) *Attorney, Agent, or Firm* — White and Williams LLP (57) ABSTRACT

A method is provided that uses a server to dynamically configure software applications on an electronic device. Information is received from the device about the device (e.g. device OS, firmware version, make and/or model, etc.). The server determines based on the device information a set of capabilities of the device. The server then sends code for installation on the device to configure at least one of the software applications based on the determined capabilities of the device. A programmed server is also provided.

15 Claims, 5 Drawing Sheets

SYSTEM AND METHOD OF DYNAMIC CONFIGURATION ENGINE FOR ELECTRONIC DEVICES

CROSS-REFERENCE TO RELATED APPLICATIONS

This application claims the benefit of U.S. Provisional Patent Application No. 61/962,360, filed Nov. 6, 2013 and entitled "System and Method of Dynamic Configuration Engine for Electronic Devices," which is incorporated herein by reference in its entirety.

FIELD OF INVENTION

The invention in general relates to customer care systems for electronic devices and in particular relates to electronic communication devices for example Smartphones, tablets, TVs, entertainment systems, vehicles, navigation systems etc.

BACKGROUND OF THE INVENTION

The current method of gathering and obtaining device information required for diagnostics is manual and therefore complex, time-consuming and prone to human errors. In the course of a customer care session for a device, a Customer Service Representative ("CSR") must undertake the extensive and time-consuming task of asking the user complex questions pertaining to their wireless devices for problem diagnosis. This requires CSRs to be experts on many types of devices and their applications, and also requires users to spend increased time on the telephone to receive support for their applications. This situation is only getting worse with the passage of time as devices become more powerful and capable of handling more sophisticated tasks. The result is increased support costs, increased call handling times, complex diagnostic processes and overall frustration.

Therefore customers no longer want to call service providers to make changes to their services or to get some basic problem resolved, instead choosing customer care apps and web based self-care systems. Such systems deliver a more convenient, always-on, communication channel that helps lower cost of customer service and reducing staff workload by eliminating the number of customer service calls.

Self-care enables customers to check their balances, view financial transactions and invoices, modify personal details, change billing cycle dates, modify payment methods, change service parameters, and most importantly troubleshoot some of the basic issues that they may encounter.

Some existing methods provide an app on the device that can gather the information from the device and send it to the server for analysis. However, these methods have inherent problems that stem from the fact that there are many different devices that run on many different operating systems with different versions of operating systems and firmware. Additionally each of the device manufacturers tends to modify the OS version to suit the manufacturer's own needs, creating more fragmentation in the market. These unique branches of operating systems sometimes require a different device agent that may be specifically designed for that particular device. Thus many different versions of device agents may be required for addressing a broad customer audience with a wide selection of devices. These app versions require active management of all device agents to keep them current, as these devices go through updates of operating system, firmware and software during their normal lifecycle of use.

Additionally, each time an app is updated, it has to be resubmitted to the curated retail application marketplace (e.g. the AppStore) for approval and uploading. This adds delay to the app update process and may also create further fragmentation as some people may have an older version of the app while others may have a newer version of the app.

Thus we note that prior art methods have inherent limitations and are in need of improvement. In particular, it would be desirable to allow new features (e.g. OS features) to be managed across devices without the need to resubmit an app or recompile a device agent. It would be desirable to reduce the need for regular updating of an app (which currently requires a user to get a new version of the app from the app store), and instead allow apps on the device to be "updated" through configuration changes and API changes applied only to specific parts of the apps.

SUMMARY

Broadly speaking, the present invention provides a method and a system whereby the overhead of managing the app, device and OS fragmentation is greatly reduced as the app does not require constant replacement, but can simply be tweaked with smaller and more targeted code updates to take advantage of new features (e.g. OS features) as they become available.

In one embodiment, the system and the method provides a self-care system that reduces the overhead of managing app fragmentation across multiple devices by having a server manage the complexity of dealing with various different combinations of versions of operating system and firmware of the devices. The server pushes new code or updated API lists to said devices as these devices go through their lifecycle. Thus initially a version of the app for each OS may be distributed to the devices, and then based on the device capabilities, the components of the app on that device may be updated with the appropriate code, scripts, API lists etc. to make it pertinent to the device. Thereafter any changes that are required on an app component may be made at the server side and the app component on the device is updated via a network connection to reflect these changes.

The system and the method provides a codified knowledgebase where rules are used to match the code, scripts, API lists etc. for each device based on their make, model, OS and firmware versions. A related exemplary rules-based system is described and taught in U.S. patent application Ser. No. 13/968,631, filed Aug. 16, 2013, which is incorporated herein by reference. Another such system using a device-based approach is described and taught in U.S. patent application Ser. No. 14/256,640, filed Apr. 18, 2014, which is incorporated herein by reference.

It is widely known in the industry that having different combinations of versions of operating system and firmware causes massive fragmentation even for the same device. Thus when there are hundreds of devices with different makes and models, the added complexity of having different variations and combinations of versions of operating system and firmware worsens the already fragmented situation. Thus by using the method and system such complexity can be easily managed at the server level, without having the need to replace the app constantly with a newer version in order to be able to handle new functionality that may have become available as a result of a new version of operating system and an update to the firmware.

According to one aspect, a method is provided whereby registration and listening to events can be managed centrally at a server. Thus as more functionality may become available at the device when a new version of OS or firmware is installed, there is no need to update the app on the device. The list of events that may be available for each device for registration and listening can be updated once at the server side, and upon connection to the server, the relevant components of the app on the device can be updated for any new events that may have been added as a result of new functionality becoming available through updates of the operating system and/or firmware.

In one embodiment Device1 and Device2 may have different hardware, software and firmware; e.g. Device1 is a Smartphone while Device2 is a tablet, thus having very different capabilities. Thus in order to register and listen to new events, there are no changes required at the device agent level, no update of code or version is required. By making changes at the server level only once, subsequently devices Device1 and Device2 can now get the updated functionality in the app so that each can register and listen to a different set of events based on their capabilities.

Devices that can benefit from the system may include but are not limited to a computer, a server, network appliance, set-top box, SmartTV, embedded device, computer expansion module, personal computer, laptop, tablet computer, personal data assistant, game device, e-reader, a mobile device for example a Smartphone, any appliances having internet or wireless connectivity and onboard automotive devices such as navigational and entertainment systems. Such devices may also benefit from the fact that there are hundreds of parameters and by machine reading these data elements increased accuracy is ensured.

The system and method reduces the need for replacing the app frequently, reduces the complexities of managing the fragmentation, increases time to market by not having to resubmit the app for approval and distribution at an App-Store. Additionally there is less overhead on the device side to manage a large set of rules most of which may not even apply to it, as the logic for dealing with scores of devices is handled at the server side.

According to a first aspect, a method is provided for using a server to dynamically configure software applications on an electronic device. Information about the device is received from the device (e.g. the device OS, firmware version, make and/or model, etc.). Based on the device information, the server can determine a set of capabilities of the device. The server can then send code for installation on the device to configure at least one of the software applications on the device based on the determined capabilities of the device.

In one embodiment, the code is provided with an indicator to enable the application on the device to verify its authenticity or trusted origin.

When determining the set of capabilities of the device, the server may also checking the date, timestamp or version of any previous code update. (Code may be considered stale if a later date, timestamp or version of the code is available.)

Preferably, the code is less than a complete version of the application. For example, the code may be a script or a list of APIs. The code may fix, modify or reset a value or setting on the device. The code may enable the application to use a new OS feature.

Preferably, the code is sent and can be installed without the user having to visit a download site or app store.

The code may be provisioned by wireless, cellular, or another communication method. An available or preferred communication method may be determined based on the determined set of capabilities and based on network access of the device.

When determining the set of capabilities of the device, the server may review aspects of the device information against conditions in a set of rules stored on the server. The set of rules may be a subset of a larger set of rules, the subset having been pre-selected as relevant to the device based on the device information.

The method may also include registering the device for event listening according to the capabilities of the device. The method may include enabling the device to listen for events related to at least one of the software applications on the device such that the server automatically sends further code to the device to configure such software applications when available.

The event listening registrations may be reset based on changes in the capabilities.

According to a second aspect, a server is provided that is programmed for dynamically configuring software applications on an electronic device in communication with the server. The server has server code for receiving from the device information about the device. The server also has server code for determining based on the device information a set of capabilities of the device. The server also has server code for sending code to the device for installation on the device to configure at least one of the software applications on the device based on the determined capabilities of the device.

In one embodiment, the step of determining capabilities of the device includes checking a database of device capabilities. The database may be stored on the server or may simply be queryable by the server.

DETAILED DESCRIPTION

Before embodiments are explained in detail, it is to be understood that the invention is not limited in its application to the details of the examples set forth in the following descriptions or illustrated drawings. It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation.

It should also be understood that many components and items are illustrated and described as if they were hardware elements, as is common practice within the art. However, in at least one embodiment, the components comprised in the method and tool are actually implemented in software.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at run-time many common behaviours that other programming languages might perform during compilation. JavaScript, PHP, Perl, Python and Ruby are examples of dynamic languages.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. A computing device may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app other simulation may be stored on a storage media such as a DVD, a CD, flash memory, USB memory or other type of memory media or it may be downloaded from the internet. The storage media can be coupled with the computing device where it is read and program instructions stored on the storage media are executed and a user interface is presented to a user. For example and without limitation, the programmable computers may be a server, network appliance, set-top box, SmartTV, embedded device, computer expansion module, personal computer, laptop, tablet computer, personal data assistant, game device, e-reader, or mobile device for example a Smartphone. Other devices include appliances having internet or wireless connectivity and onboard automotive devices such as navigational and entertainment systems.

The program code may execute entirely on a mobile device or partly on the mobile device as a stand-alone software package; partly on the mobile device and partly on a remote computer or entirely on the remote computer or server. In the latter scenario, the remote computer may be connected to the mobile device through any type of network, including a local area network (LAN) or a wide area network (WAN), or the connection may be made to the internet through a mobile operator network (e.g. a cellular network).

Figure 1:
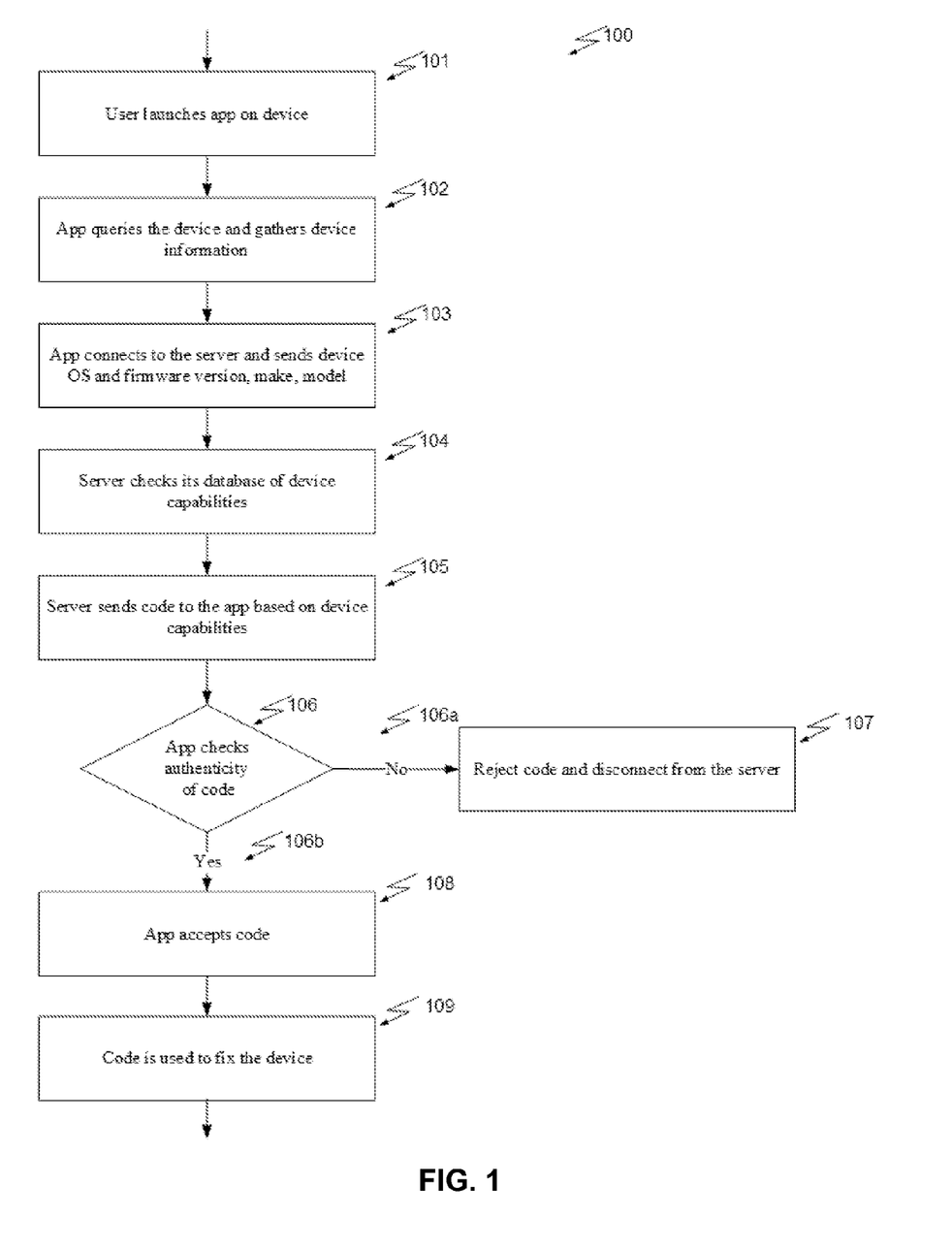
FIG. 1 is a flow diagram illustrating updating code on a device based on determined device capabilities according to an aspect of the present invention.

FIG. 1 is a flow diagram of certain overarching concepts of the present method. According to the method, the user launches an app on a device 101. In one embodiment, the system and the method provides a self-care system that reduces the app fragmentation across devices by having a server manage the complexity and pushing new code or updated API lists to devices as these devices are updated with new versions of operating systems and firmware. This eliminates the need to keep updating and resubmitting the app to the AppStore for wholesale replacement on devices.

The app queries the device and gathers device information 102. Information that can be gathered from the device may include but is not limited to: the device make, model and manufacture information; applications (commonly referred to as "apps") installed on the device; apps and processing running on the device; certificates on the device; user profile information; the character of any passcode used to authenticate a user (e.g. whether a password/passcode is used and the relative strength of that password, such as the number of characters); operating system of the device; information regarding whether the device operating system has been tampered with by the user (e.g. an iOS device has been jailbroken, or a Google Android device has been rooted); and the data usage e.g. the amount of MB or GB used for a given billing period, the amount of data used while roaming, or the relative amount compared to a data plan used by the user-which may be useful for monitoring or controlling costs when paying for data usage.

The app connects to the server and sends device make, model, OS and firmware versions to the server 103. The connection between the app and the server may be over the internet or other network and may use WiFi or cellular or other type of connectivity.

The server checks its database of device capabilities 104. Devices differ in their capabilities as a result of having different hardware platforms, OS and firmware versions. For example a Smartphone and a tablet, even though running the same operating system will be significantly different in terms of their hardware e.g. the Smartphone has 3G and Bluetooth radios, while the tablet has a larger screen size, thus having different capabilities.

The server sends code to the app based on the device capabilities 105. The server may send to the device code, scripts, list of APIs, and updates to these. When sending code, scripts, list of APIs, and updates to the device the server may also take into account the device make, model, OS and firmware versions amongst other things.

The app checks whether the code received from the server is authentic 106. If the code received from the server is not authentic 106a the device disconnects from the server and discards any code received from the server 107.

If the code received from the server is authentic 106b, then the app accepts the code 108.

A sample code snippet is given below:
Airplane Mode: Client Code:

```
if(Build.VERSION.SDK_INT >= 17) {
    Intent intent = new
Intent("android.settings.AIRPLANE_MODE_SETTINGS");
    intent.setComponent(name);
    act.startActivityForResult(intent, who);
} else {
    // toggle airplane mode
    Settings.System.putInt(getActivity( ).getContentResolver
    ( ), Settings.System.AIRPLANE_MODE_ON, val);
    // Post an intent to reload
    boolean enable_airplanemode=false;
    if (val == 1) {
        enable_airplanemode=true;
    }
    Intent intent = new
Intent(Intent.ACTION_AIRPLANE_MODE_CHANGED);
    intent.putExtra("state", enable_airplanemode);
    getActivity( ).sendBroadcast(intent);
}
```

The code may be used to fix the device 109 or simply to augment functionality or improve the device or an app. In one embodiment, the fix may be automatically applied. In another embodiment, the code may provide a solution where the user may be able to edit, add, delete, or modify etc. the values required in a field or change a setting. In other embodiments, the code may be used to configure the device or its software applications as needed.

In theory, the same results could be achieved by having a device based method, but this would come at a huge overhead cost. For example, managing a large set of rules on the device (most of which may not even apply to that device) would be cumbersome and inefficient, as the logic for dealing with scores of devices is coded into the app. Moreover, when the device capabilities change as a result of an update to the operating system or firmware, the app becomes dated and needs to be updated.

Figure 2:
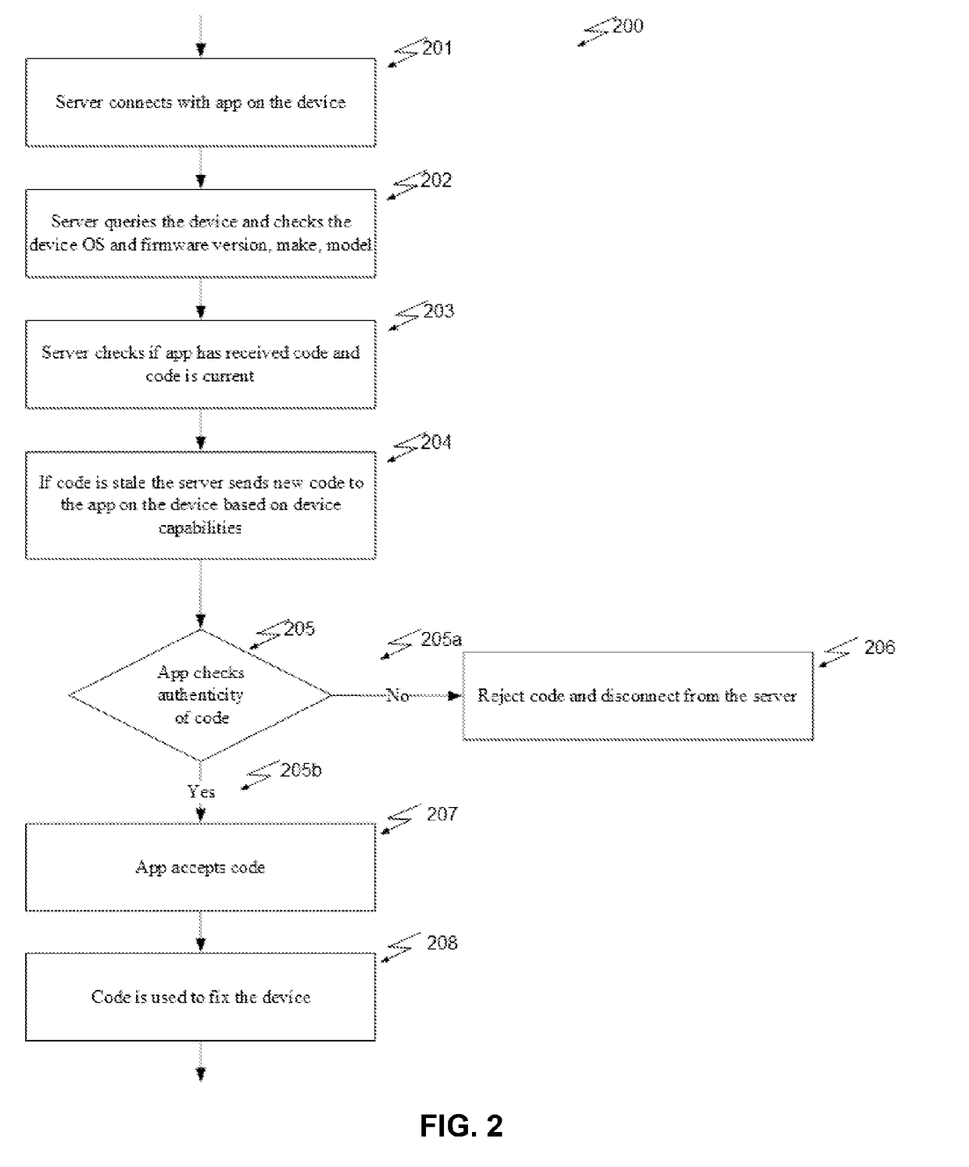
FIG. 2 is a flow diagram illustrating a server connecting to a device and sending updated code to the device.

FIG. 2 shows the process whereby a server may connect to a device and send it code based on device make, model, OS and firmware versions 200. Server connects with the app on the device 201. In one embodiment, the server may connect to the device over the cellular network, while in another it may use a WiFi network to connect to the device.

The server queries the device and checks the device OS and firmware versions, device make and model 202. Other information may also be gathered from the device and is not limited to the aforementioned examples.

The server checks if the app has received code in the past and if the code is current 203. In order to check the recency of the received code the server may check date/time and or timestamp and or version of the code. This can be achieved by comparing the date/time and or timestamp and or version of the code on the device with that on the server. If the code on the device is stale i.e. it is older than the code on the server, then the server sends new code to the app on the device based on the device capabilities 204.

The server may send to the device code, scripts, list of APIs, and updates to these. When sending code, scripts, list of APIs, and updates to the device the server may also take into account the device make, model, OS and firmware versions amongst other things.

The app checks whether the code received from the server is authentic 205. If code received from the server is not authentic 205a, the device disconnects from the server and discards any code received from the server 206.

If the code received from the server is authentic 205b then the app accepts the code 207.

The code may be used to fix the device 208 or simply to augment functionality or improve the device or app. In one embodiment the fix may be automatically applied. In another embodiment the code may provide a solution where the user may be able to edit, add, delete, or modify etc. the values required in a field or change a setting. In other embodiments, the code may be used to configure the device or its software applications as needed.

Figure 3:
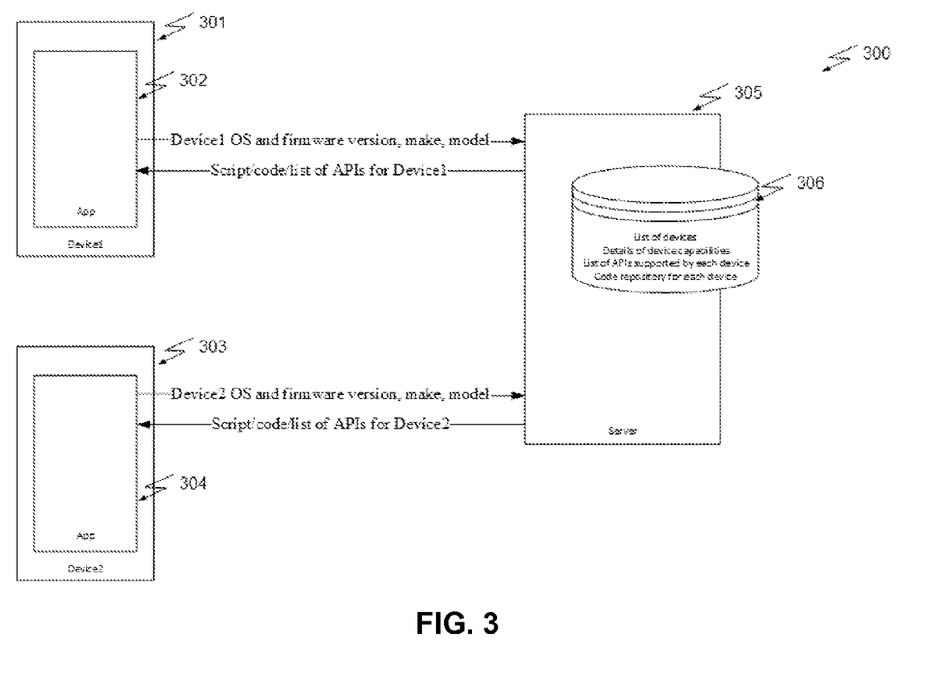
FIG. 3 is a network diagram illustrating updating of scripts, code, APIs, etc., selectively, on two devices (Device1 and Device 2).

FIG. 3 shows the process of providing scripts, code, and list of APIs etc. to configure applications on the devices using a server-managed process 300.

In FIG. 3, Device1 301 is running the app 302, and Device2 303 is also running the app 304. Device1 and Device2 may be different in terms of hardware, software and firmware; e.g. Device1 is a Smartphone while Device2 is a tablet, thus may have very different capabilities.

Server 305 has a database or other storage 306 that stores and manages information such as a list of devices, details of device capabilities, and list of APIs supported by each of the devices, and code repository for each of the devices, amongst other things.

The app 302 sends to the server 305 the device OS and firmware versions, make and model of the device Device1. The server queries the database 306 and after identifying Device1 in its records the server sends code, script(s), list of APIs etc. that are designed for Device1 and match its capabilities.

Similarly the app 304 sends to the server 305 the device OS and firmware versions, make and model of the device Device2. The server queries the database 306 and after identifying Device2 in its records the server sends code script(s), list of APIs etc. that are designed for Device2 and match its capabilities.

Thus we note that app 302 and app 304 running on two different devices that may have different hardware platforms, different operating systems and different firmwares can be effectively "updated" from the server to enable new or increased functionality without having to resubmit the app to the AppStore, reinstall or update the app in a traditional way on the device. In this sense, the method and system provide dynamic configuration for the apps on the device.

Figure 4:
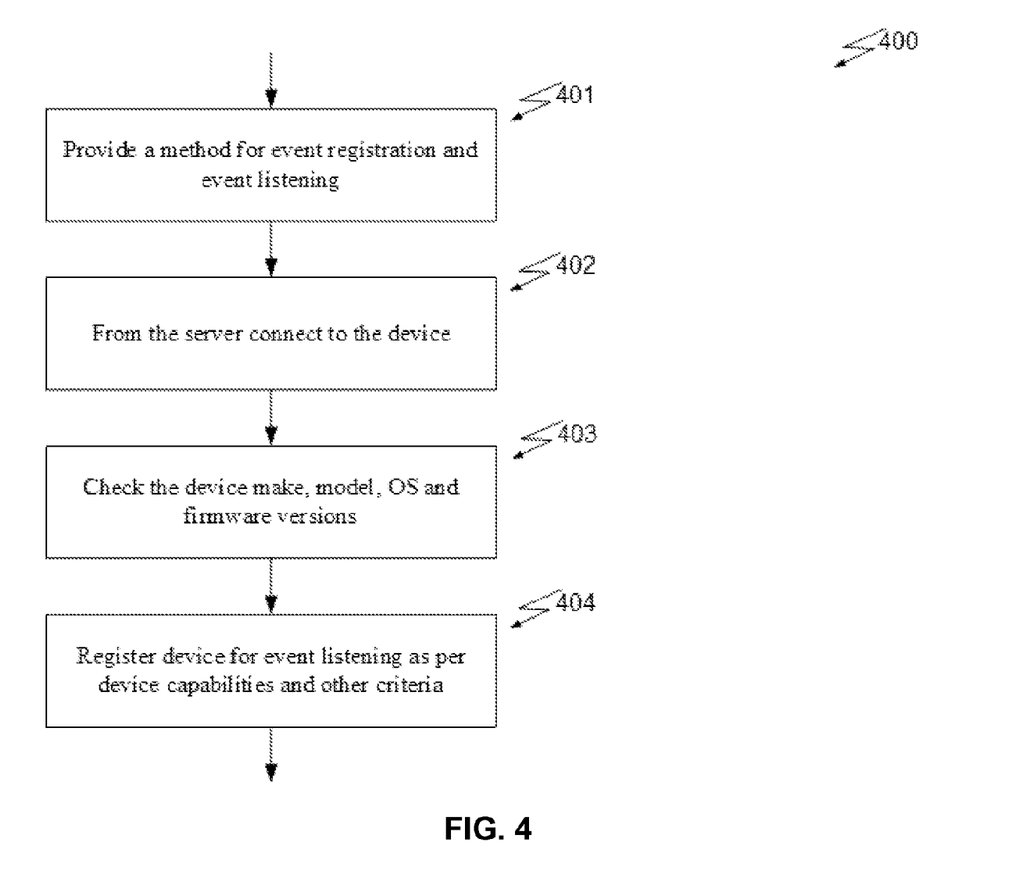
FIG. 4 is a flow diagram illustrating a basic process for event registration and listening.

FIG. 4 shows the process 400 for registration and listening to device events based on having a server manage this process. A method is provided for event registration and event listening 401.

The server is connected to the device 402. The connection between the app and the server may be over the internet or other network and may use WiFi or cellular or another type of connectivity.

The system checks the device make, model, OS and firmware versions 403. There may be a database on the server side that stores information about different device makes, models, OS and firmware versions for each, and the code, scripts, list of available APIs, events that can be registered and listened to etc. for each device. A rules engine may be used to make the best match between the information gathered from the device and the information that is available on the server.

The server registers the device for events listening according to the device capabilities and other criteria 404.

TABLE 1

| Event  | Device1 | Device2 | Device3 |
|--------|---------|---------|---------|
| Event1 | ✓       |         | ✓       |
| Event2 |         | ✓       | ✓       |
| Event3 | ✓       |         | ✓       |
| Event4 |         | ✓       | ✓       |
| Event5 | ✓       |         | ✓       |

Table 1 above shows a list of events Event1 to Event5 and Device1, Device2 and Device3 registered for different events based on their capabilities, make, model, OS and firmware version.

We can see that the server has registered Device1 for listening to Event1, Event3 and Event5.

Similarly, the server has registered Device2 for listening to Event2 and Event4. Device3 has been registered at the server for Event1, Event2, Event3, Event4 and Event5.

Let us consider an example of two devices: Device1 which is a Smartphone; and Device2 which is a tablet. Since Device1 and Device2 have different capabilities, different events are available for registration and listening to on each device. For example Device1 being a Smartphone may have Bluetooth and 3G radios, while Device2 may not have this capability. Thus by having a server side set of events for each device according to its capabilities the app management process is simplified.

Therefore, we note that only one version of the app may be required for Device1 and Device2, but both can have a different set of events for registration and listening based on their capabilities.

Figure 5:
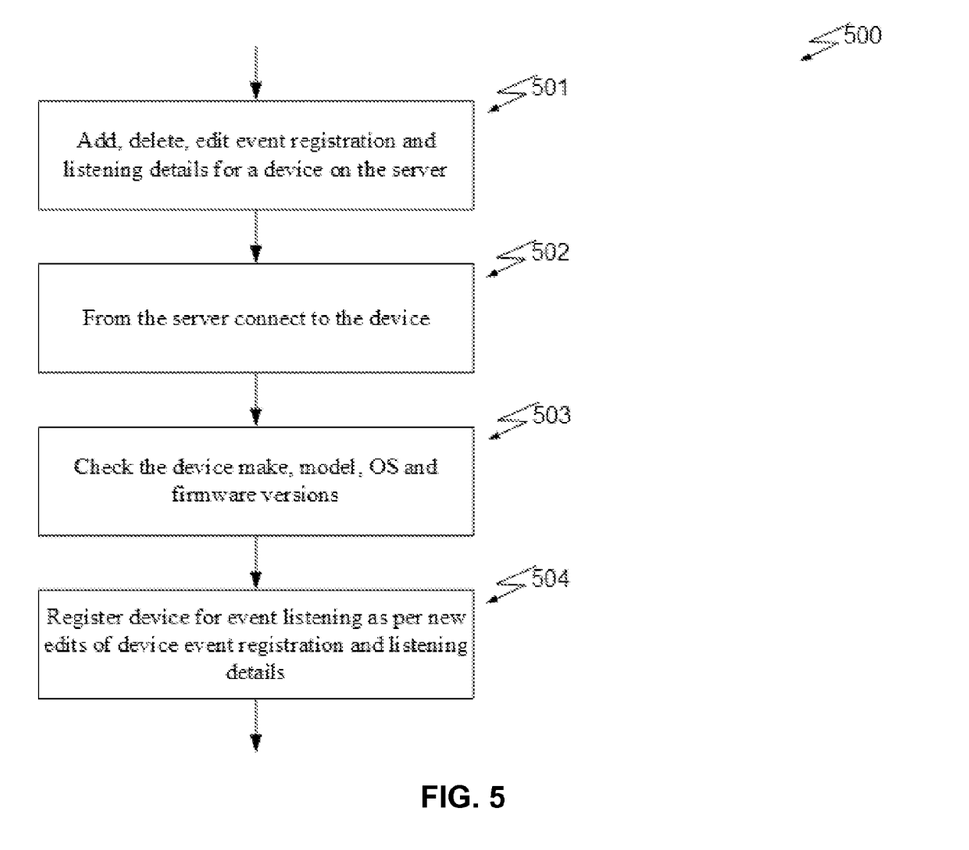
FIG. 5 is a flow diagram illustrating ongoing management of event registration and listening as device capabilities change.

FIG. 5 shows the process 500 for adding, deleting and editing the registration and listening of device events using a server to manage this process. A method is provided to add, delete, or edit event registration and listening details for a device on the server 501.

The server connects to the device 502. The connection between the app and the server may be over the internet or other network and may use WiFi or cellular or other type of connectivity.

In one embodiment, the device connects to the server to initiate the process, as described in FIG. 5.

The server checks the device make, model, OS and firmware versions 503. There may be a database on the server side that stores information about different device makes, models, OS and firmware versions for each and the code, scripts, list of available APIs, events that can be registered and listened to etc. for each device. A rules engine may be used to make the best match between the information gathered from the device and the information that is available on the server.

The server registers the device for the event listening as per new edits of device events registration and listening details 504.

TABLE 2

| Event  | Device1 | Device2 | Device3 |
|--------|---------|---------|---------|
| Event1 | ✓       | ✓       | ✓       |
| Event2 |         | ✓       | ✓       |
| Event3 |         |         | ✓       |
| Event4 |         |         | ✓       |
| Event5 | ✓       |         | ✓       |
| Event6 |         | ✓       |         |
| Event7 | ✓       |         |         |
| Event8 | ✓       | ✓       |         |

Table 2 above shows that after a while the list of events and the devices registered for event listening have changed. We note that Event6, Event7 and Event8 have now been added to the list.

At this stage we can see that the server has automatically registered Device1 for listening to Event1, Event5, Event7 and Event8.

Similarly the server has registered Device2 for listening to Event1, Event2, Event6 and Event8. Events for Device3 are unchanged and it is registered by the server for Event1, Event2, Event3, Event4 and Event5.

Thus we note that there are no changes required at the device agent level, no update of code or version is required on the device in order to register and listen to new events. By making changes at the server level only once, subsequently each device can now get the new functionality in the app so that it can register and listen to a new set of events all without undergoing a formal process of updating.

TABLE 3

| | Device1 | | | |
|---|---|---|---|---|
| Event | OS V1.0; Firmware V1.0 | OS V1.1; Firmware V1.0 | OS V1.0; Firmware V1.5 | OS V1.1; Firmware V1.5 |
| Event1 | ✓ | ✓ | ✓ | ✓ |
| Event2 | ✓ | ✓ | ✓ | ✓ |
| Event3 |   |   |   | ✓ |
| Event4 |   |   |   | ✓ |
| Event5 |   |   |   | ✓ |
| Event6 |   | ✓ |   | ✓ |
| Event7 |   |   |   | ✓ |
| Event8 |   | ✓ |   | ✓ |

Table 3 above shows how different combinations of versions of operating system and firmware can have an effect on the device event registration and listening. It is widely known in the industry that having different combinations of versions of operating system and firmware causes massive fragmentation even for the same device. Thus when there are hundreds of devices with different makes and model, the added complexity of having different variations and combinations of versions of operating system and firmware worsens the already fragmented situation.

Thus by using the method and system such complexity can be easily managed at the server side, without having the need to have a complex app. Similarly new versions of the app are not required in order to be able to handle or take advantage of new functionality that may have become available as a result of a new version of operating system and/or an update to the firmware.

Table 3 above shows one such exemplary situation for Device1 only. In this example Device1 is fragmented by having two versions of operating system V1.0 and V1.1, and having two versions of firmware V1.0 and V1.5. Thus this results in different combinations of these variants resulting in fragmentation across Device1 whereby some Device1 devices have OSV1.0 and Firmware V1.0, some devices have OSV1.1 and Firmware V1.0, others have OSV1.0 and Firmware V1.5 while still others have OSV1.1 and Firmware V1.5.

This can result in the same hardware device (Device1) exhibiting different behaviours and capabilities due to this mix of combinations. In reality this situation can be much more complicated and difficult to manage in real life. The exemplary situation for Device1 as shown in Table 3 will illustrate this further.

From Table 3 above we note that for Device1 when OS V1.0 and Firmware V1.0 are installed, Event1 and Event2 are available for registration and listening. When Device1 OS is updated to V1.1 but the firmware is still V1.0, Event1, Event2, Event6 and Event8 are available for registration and listening.

When Device1 OS is V1.0, but the firmware is updated to V1.5, only Event1 and Event2 are available for registration and listening. But when both OS and Firmware on Device1 are updated as in the last column where OS V1.1 and Firmware V1.5 are installed, Event1, Event2, Event3, Event4, Event5, Event6, Event1 and Event8 are available for registration and listening.

Some sample code snippets are given below as examples:
Data Roaming

```
ComponentName cName = null;
if(Build.VERSION.SDK__INT>=16) {
    cName = new
ComponentName("com.android.phone","com.android.phone.Mobile
NetworkSettings");
}else{
    cName = new
ComponentName("com.android.phone","com.android.phone.Settings");
}
Intent intent = new Intent( );
intent.setComponent(cName);
context.startActivity(intent);
```

Dynamic Engine Code Snippets:
Server Side:

```
import com.crowdcare.DynamicEngineScripts;
String fixScript = DynamicEngineScripts.getScript("Select
script from DynamicEngineScripts where scriptType =
'DataRoaming' and SDK="+SDKversion);
String signedFixScript =
DynamicEngineScripts.signScript(fixScript);
DynamicEngineScripts.pushScript(signedFixScript);
```

Client Side:

```
import com.crowdcare.DynamicEngine;
if(DynamicEngine.isTrustedOrigin(fixCode)){
    DynamicEngine.appFix(fixCode);
}
```

Dynamic Engine Code:
Server Side:

```
import com.crowdcare.DynamicEngineScripts;
String fixScript = DynamicEngineScripts.getScript("Select
script from DynamicEngineScripts where scriptType =
'AirPlaneMode' and SDK="+SDKversion);
String signedFixScript =
DynamicEngineScripts.signScript(fixScript);
DynamicEngineScripts.pushScript(signedFixScript);
```

Client Side:

```
import com.crowdcare.DynamicEngine;
if(DynamicEngine.isTrustedOrigin(fixCode)){
    DynamicEngine.appFix(fixCode);
}
```

In one embodiment, the server may use a rules engine to match the device make, model, OS and firmware versions to the correct code, scripts, list(s) of APIs etc. for a device based on its capabilities. A rules engine is a software system that executes one or more rules in a runtime environment. A rule engine may be viewed as a sophisticated if/then statement interpreter. The if/then statements that are interpreted are called rules. In another embodiment the rules engine may be hosted on a remote server and the device may connect to the remote server over a network e.g. over internet.

A rule consists of some number of conditions and some number of actions. Generally the rules are written in a high-level business language that relates to the domain, storing the rules in the repository. A database may be used as the preferred and exemplary embodiment to store the rules. In another embodiment the rules may be stored in a list, in a table or other method that may be suitable for so doing.

A rule can generally be represented as IF CONDITION(S) THEN RECOMMENDATION(S)/FIX(ES). It can consist of one or more conditions (the "IF"). One or more conditions can be grouped together by "and" and "or" and the order of operations can be further defined using brackets. In each condition, there could be a device attribute, a conditional operator (=, >, <, !=, exists, not exists) and then a text box in which to enter static text, numeric, date-time value or another device attribute. These conditions can then be rearranged, grouped, and joined together to form a bigger condition.

A rule should also contain a recommendation or a fix (the "THEN"). When saved, the rules will follow the Rules Lifecycle (status including but not limited to DRAFT, PENDING, VALIDATION, REJECTED, VALIDATED (Nth), ACTIVE, INACTIVE) and only active rules may be disseminated to other sources. The scope of a rule can be system-wide, device-specific, model-specific, manufacturer-specific, operator-specific etc.

The rules may also preferably use reference values, standard values, target values, a range of values etc. to compare and create a list of delta of the values of a field on the device.

A sample rule is shown below:

```
if(Device.DataRoaming = On and Device.IsRoaming = True){
    TurnOff DataRoaming;
}
```

Code to Turn Off Roaming:

```
import com.crowdcare.DynamicEngineScripts;
String fixScript = DynamicEngineScripts.getScript("Select
script from DynamicEngineScripts where scriptType=
'DataRoamingOff' and SDK="+SDKversion);
String signedFixScript =
DynamicEngineScripts.signScript(fixScript);
DynamicEngineScripts.pushScript(signedFixScript);
```

It is to be understood that the rules engine is not necessarily linear when executing (or firing) the rules. There may be a common starting point when executing the rules, but as the rules get executed and as information gathered from the device and additional information is analyzed, one rule may trigger another rule that may be part of another set of rules. There may also be loops, so that there are rules embedded within rules, or a rule many call another rule as part of its execution. The rule that is called from within the loop or the rule that is called as part of the execution of another rule may not be fixed or static but may depend on the situation and vary as needed.

In order to increase accuracy and efficiency the rules may take into account the information that has been machine read from the device. The rules engine may also take into account any other information e.g. a user may have asked a specific question, user preferences in terms of language, time zone, medium of communications etc. and finds the best fit in terms of code, scripts, API list(s) etc. that may be available for the device taking its make, model, OS and firmware versions into consideration.

It should be understood that although the term application has been used as an example in this disclosure in essence the term may also apply to any other piece of software code where the embodiments are incorporated. The software application can be implemented in a standalone configuration or in combination with other software programs and is not limited to any particular operating system or programming paradigm described here.

Several exemplary embodiments/implementations have been included in this disclosure, but the intent is to cover all such areas that may benefit from the present system and method.

The above examples are not intended to be limiting, but are illustrative and exemplary.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A method of using a server to dynamically configure software applications on electronic devices, comprising:
    the server having a database of device capabilities correlated to device make, model, operating system (OS), and firmware versions, the capabilities not being limited to capabilities with respect to any particular software application;
    upon the server receiving a request by a first device to update a software application, the server receiving from the first device information about the first device, wherein the first device information including first device's make, model, OS, and firmware versions;
    the server determining, based on the first device information having regard to the database, a set of capabilities of the first device;
    the server sending a first set of code to the first device for installation on the first device to configure and update the software application on the first device based on the determined the set of capabilities of the first device,
    upon the server receiving a request by a second device to update the software application that is same as in the first device, the server receiving from the second device information about the second device, wherein the second device information including second device's make, model, OS and firmware versions, and at least one of which is different from the first device;
    the server determining, based on the second device information having regard to the database, a set of capabilities of the second device:
    the server sending a second set of code to the second device for installation on the second device to configure and update the software application on the second device based on the determined the set of capabilities of the second device;
    wherein the first and the second sets of code enable the updated software application to be configured to match respective capabilities to the first and second devices based on their individual make, model, OS and firmware versions, and each of the first and the second sets of code is provided with an indicator to enable the software application on each of the first and second devices to verify its authenticity or trusted origin.

2. The method of claim 1, wherein determining a set of capabilities further comprises checking the date, timestamp or version of any previous code update.

3. The method of claim 1, wherein at least one of the first or second set of code is less than a complete version of the application.

4. The method of claim 1, wherein at least one of the first or second set of code is a script.

5. The method of claim 1, wherein at least one of the first or second set of code is a list of APIs.

6. The method of claim 1, wherein at least one of the first or second set of code fixes, modifies or resets a value or setting on the device.

7. The method of claim 1, wherein at least one of the first or second set of code enables the application to use a new OS feature.

8. The method of claim 1, wherein first and second sets of the code is are sent and can be installed without the user in either case having to visit a download site or app store.

9. The method of claim 1, wherein at least one of the first or second set of code is provisioned by wireless, cellular, or another communication method, based on the determined set of capabilities and based on network access of the device.

10. The method of claim 1, wherein determining a set of capabilities includes reviewing aspects of the device information against conditions in a set of rules stored on the server.

11. The method of claim 10, wherein the set of rules is a subset of a larger set of rules, the subset having been pre-selected as relevant to the first and second device based on the its device information.

12. The method of claim 1, further comprising registering the first or second device for event listening according to the capabilities of the first or second device.

13. The method of claim 12, further comprising listening for events related to at least one of the software applications on the device and sending further code to the device to configure such software applications.

14. The method of claim 13, further comprising resetting the event listening based on changes in the capabilities of the first or second device.

15. The method of claim 1, wherein, on at least one of the first or second devices, requesting an upgrade occurs in response to the server querying the device.

* * * * *